Case. C.

C. Shea. Compensating Spring.

3984

REISSUED MAY 17 1870

Witnesses:

Alex. F. Roberts
Geo. H. Mabee

Inventor:

C. Shea

PER Munn & Co

Attorneys.

United States Patent Office.

CHARLES SHEA, OF NEWARK, NEW JERSEY.

*Letters Patent No.* 95,736, *dated October* 12, 1869; *reissue No.* 3,984, *dated May* 17, 1870.

DIVISION C.

IMPROVEMENT IN COMPENSATING OR EQUILIBRIUM SPRINGS.

The Schedule referred to in these Letters Patent and making part of the same.

*To all whom it may concern:*

Be it known that I, CHARLES SHEA, of Newark, in the county of Essex and State of New Jersey, have invented a new and improved Compensating or Equilibrium Spring for Railroad-car Trucks; and I do hereby declare that the following is a full, clear, and exact description thereof, which will enable others skilled in the art to make and use the same, reference being had to the accompanying drawing forming part of this specification, in which—

Figure 1:
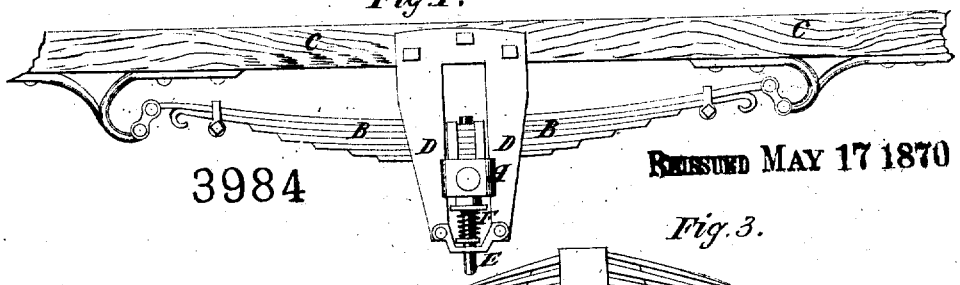
Figure 1 is a side view of a railroad-car spring provided with my compensating attachment.
Figure 2:
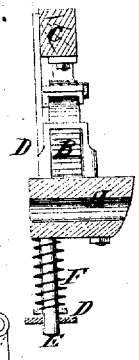
Figure 2 is a vertical transverse section of the same.
Figure 3:
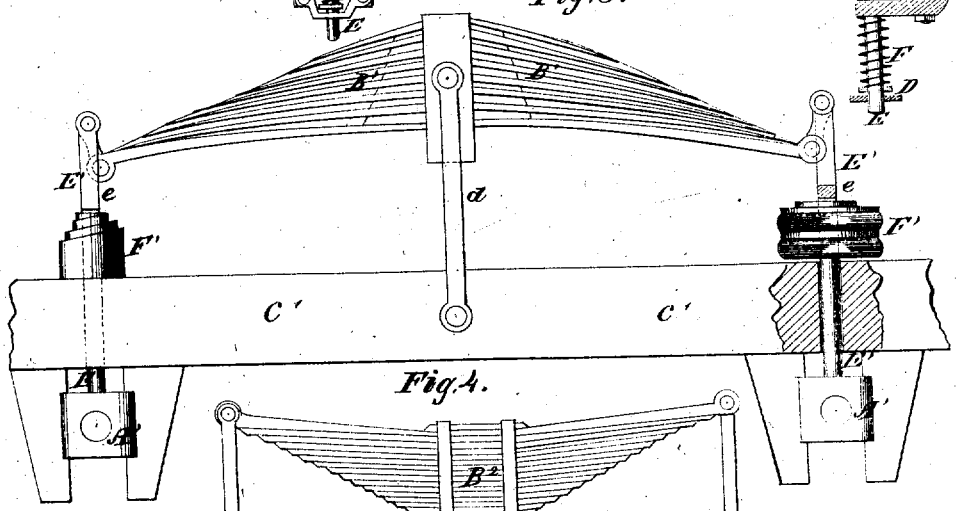
Figure 4:
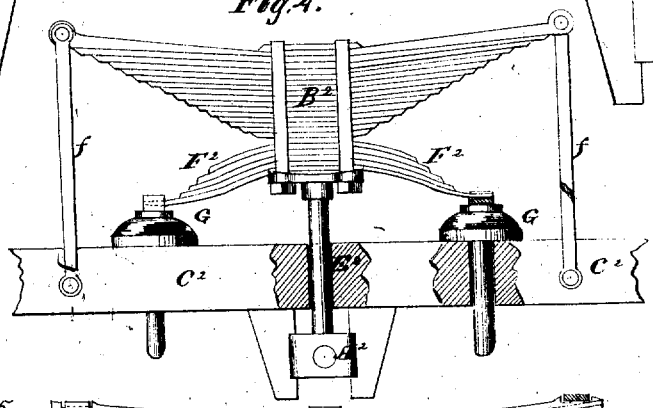
Figure 5:
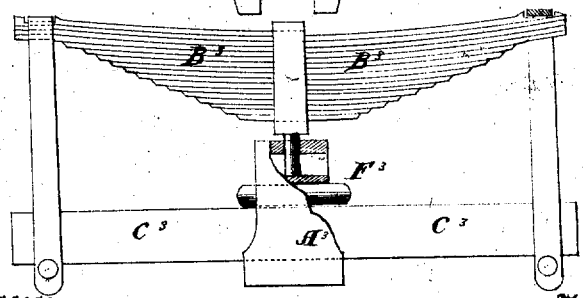

Figures 3, 4, and 5 are side views of modifications of the same.

Similar letters of reference indicate corresponding parts.

The object of this invention is to provide means for avoiding the jar and inconvenience on railroad cars, and for economizing springs on the same.

The invention consists chiefly in providing compensating springs in connection with the ordinary springs of trucks, cars, locomotives, &c., the said compensating springs being so arranged that they act in opposite directions to the main springs. When the pressure is on the main or bearing spring it is off the compensating spring, and when on the latter it is off the former.

It is well known that railroad-cars, tenders, &c., when loaded, are not so liable to break their springs as they are when not loaded, because, in the latter case, the great shock produced by the passing of the wheels over uneven portions of the track, or over badly-fitted railroad joints, will produce a rebound of the car-body injurious to the spring.

By my invention all these defects are entirely overcome, as the additional counteracting springs keep all the main springs so balanced that they cannot be overstrained when the weight on them is suddenly thrown off, with a tendency of stretching them in the wrong direction.

In the drawing are illustrated various modifications of my invention, showing it applied in different forms.

It will be noticed that in all cases the same principle is applied, to wit, that of providing a counteracting spring to the main bearing spring of a railroad-car truck.

A in the drawing represents the axle-box of a car-truck, of suitable construction, said box being strapped to the main spring B, that is suspended from the truck-frame C.

The box works up and down in a slotted plate, D.

E is a pin, suspended from the box A and fitted through an aperture in the lower end of the plate D.

A spiral volute, rubber, or other suitable spring, F, is interposed between A and the lower part of D, and fitted around E.

When a weight presses upon the frame C, the spring B is stretched as the frame is lowered; but when by sudden jars the frame is thrown up, it compresses the spring F, and thereby prevents all parts from coming into violent contact, and from injury thereby.

In fig. 3 is shown a device for the front trucks of locomotives, and for tenders.

The truck-frame C is supported by the boxes $A^1$, which are in pairs connected with the ends of the main spring B, said main spring being, by a link, *d*, and strap, fitted at the middle upon the frame $C^1$.

Volute springs, or rubber cushions, or other springs, $F^1$, are interposed between every box $A^1$, and a shoulder, *e*, of the pin $E^1$, by which such box is connected with the main spring. The spring $F^1$ will then have the same effect on the main spring as in the case before set forth.

Figs 4 and 5 show two kinds of locomotive-spring bearings.

In fig. 4 the main spring $B^2$ has its ends, by straps *f*, connected with the frame $C^2$, while its middle rests on a pin, $E^2$, which projects from the box $A^2$.

A flat spring, $F^2$, projects from the lower part of the spring $B^2$, and has its ends supported on rubber cushions G, as shown, said cushions being formed on pins which fit loose into the frame. In this case the cushions G form part of and act in conjunction with the compensating spring $F^2$.

In fig. 5, the pin $E^3$, by which the spring $B^3$ is connected with the axle-box $A^3$, is represented as fitting upon a rubber or other spring cushion, $F^3$, which is placed upon the frame $C^3$.

In all of these cases the springs F, $F^1$, $F^2$, and $F^3$ act as compensating springs, in the manner and for the purpose hereinbefore set forth. They are compressed when the main springs B $B^1$ $B^2$ $B^3$ are expanded, and stretched when the same are compressed, for the purpose specified.

Having thus described my invention,

I claim as new and desire to secure by Letters Patent—

The compensating springs M, $M^1$, $M^2$, or $M^3$, applied to the frames of railroad-car trucks, in combination with the main bearing springs B, $B^1$, $B^2$, or $B^3$, and with the axle-boxes, as set forth.

CHARLES SHEA.

Witnesses:
GEO. W. MABEE,
CHAS. A. PETTIT